United States Patent
Yan et al.

(10) Patent No.: US 11,004,414 B2
(45) Date of Patent: May 11, 2021

(54) DISPLAY DEVICE AND METHOD FOR DRIVING THE SAME

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Bingbing Yan, Beijing (CN); Liugang Zhou, Beijing (CN); Wenwu Lu, Beijing (CN); Xueqin Wei, Beijing (CN); Lixin Zhu, Beijing (CN); Shenghua Hu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/241,331

(22) Filed: Jan. 7, 2019

(65) Prior Publication Data

US 2019/0340988 A1    Nov. 7, 2019

(30) Foreign Application Priority Data

May 7, 2018   (CN) .......................... 201810425930.X

(51) Int. Cl.
  *G09G 3/36*    (2006.01)
  *G02F 1/1345*  (2006.01)

(52) U.S. Cl.
  CPC ....... *G09G 3/3674* (2013.01); *G02F 1/13454* (2013.01); *G09G 3/3648* (2013.01); *G09G 3/3688* (2013.01); *G09G 2310/0264* (2013.01)

(58) Field of Classification Search
  CPC .. G09G 3/3674; G09G 3/3688; G09G 3/3648; G09G 3/3614; G09G 3/3696;
  (Continued)

(56) References Cited

U.S. PATENT DOCUMENTS 7,817,126 B2   10/2010   Ha et al.
8,107,032 B2   1/2012    Tsubata
(Continued)

FOREIGN PATENT DOCUMENTS

CN    1920624 A      2/2007
CN    101512628 A    8/2009
(Continued)

OTHER PUBLICATIONS

First office action dated Apr. 3, 2020 for application No. CN201810425930.X with English translation attached.

*Primary Examiner* — Kent W Chang
*Assistant Examiner* — Andrew Lee
(74) *Attorney, Agent, or Firm* — Nath, Goldberg & Meyer; Joshua B. Goldberg

(57)   ABSTRACT

A display device and a method for driving the same are provided. The display device includes an array substrate and a data driving circuit, the array substrate includes a plurality of data lines divided into multiple groups, each group includes at least two data lines, first ends of the data lines in each group are connected together by the data driving circuit during a first charge sharing phase of each scanning period, the array substrate further includes a plurality of switches; the display device further includes a control circuit configured to output a control signal during a second charge sharing phase of each scanning period, each switch is turned on according to the control signal to connect second ends of corresponding data lines in corresponding group; in each scanning period, the first charge sharing phase and the
(Continued)

second charge sharing phase are at least partially overlapped with each other.

14 Claims, 3 Drawing Sheets

(58) Field of Classification Search
CPC ..... G09G 2310/0264; G09G 2330/021; G09G 2320/0252; G09G 2320/0223; G09G 2320/0233; G02F 1/13454
See application file for complete search history.

(56) References Cited

U.S. PATENT DOCUMENTS

| | | | |
|---|---|---|---|
| 9,245,490 | B1 | 1/2016 | Cho et al. |
| 2010/0026921 | A1* | 2/2010 | Tsubata ................ G09G 3/3648 349/37 |
| 2012/0033163 | A1* | 2/2012 | Qin ........................ H01L 27/12 349/106 |
| 2014/0375536 | A1* | 12/2014 | Kim .................... G09G 3/3614 345/94 |
| 2017/0287420 | A1* | 10/2017 | Noguchi .............. G09G 3/3648 |
| 2019/0096304 | A1* | 3/2019 | Hu .......................... G09G 3/20 |

FOREIGN PATENT DOCUMENTS

| | | |
|---|---|---|
| CN | 105739735 A | 7/2016 |
| CN | 106297723 A | 1/2017 |
| CN | 107589609 A | 1/2018 |

* cited by examiner

DISPLAY DEVICE AND METHOD FOR DRIVING THE SAME

CROSS-REFERENCE TO RELATED APPLICATIONS

The present application claims the priority of Chinese Patent Application No. 201810425930.X, filed on May 7, 2018, the contents of which are incorporated herein in their entirety by reference.

TECHNICAL FIELD

The present disclosure relates to the field of display technology, and in particular to a display device and a method for driving the same.

BACKGROUND

During a procedure for driving a liquid crystal display device, in order to reduce power consumption, charging sharing is usually performed between adjacent data lines, that is, before providing a data signal to each of the adjacent data lines, the adjacent data lines are first connected together so that signals of the adjacent data lines are shared, and then each of the adjacent data lines is charged to be at a potential with a polarity opposite to that in a previous scanning period.

However, for a display device having a relatively large size, when charge sharing is performed between the adjacent data lines, due to a significant transferring latency, charge sharing effects for two ends of each of the adjacent data lines are different from each other, thus pixels at the two ends of each of the adjacent data lines are charged for different durations, which results in a non-uniform display of a display panel.

SUMMARY

The present disclosure provides a display device and a method for driving the display device.

In an aspect, an embodiment of the present disclosure provides a display device, including an array substrate and a data driving circuit, the array substrate includes a plurality of data lines, and the data lines are divided into multiple groups, each of the groups includes at least two of the data lines, a first end of each of the data lines is coupled to the data driving circuit; the data driving circuit is configured to connect first ends of the data lines in each of the groups together during a first charge sharing phase of each scanning period, the array substrate further includes a plurality of switches, the data lines in each of the groups are coupled to at least one of the switches, each of the switches is coupled to at least two of the data lines in corresponding one of the groups; the display device further includes a control circuit, the control circuit is configured to output a control signal during a second charge sharing phase of each scanning period, each of the switches is turned on according to the control signal to connect second ends of corresponding data lines in corresponding one of the groups; in each scanning period, the first charge sharing phase and the second charge sharing phase are at least partially overlapped with each other.

In some implementations, the data driving circuit is further configured to provide a data signal to each of the data lines during a charging phase of each scanning period, and the charging phase starts from a timing at which the first charge sharing phase is finished.

In some implementations, the second charge sharing phase is finished at a timing earlier than or the same as that obtained by elapsing a time duration, required for the data signal transmitting from the first end of each data line to the second end of the data line, from the timing at which the first charge sharing phase is finished.

In some implementations, in the charging phase of each scanning period, data signals provided by the data driving circuit to the data lines in each group are equal in magnitude, the data signals provided to a portion of the data lines in each group are of positive polarity, and the data signals provided to another portion of the data lines in each group are of negative polarity.

In some implementations, in charging phases of adjacent scanning periods, data signals provided by the data driving circuit to each data line are equal in magnitude and opposite in polarity.

In some implementations, in each scanning period, the first charge sharing phase and the second charge sharing are equal in time duration.

In some implementations, each of the groups consists of two adjacent data lines.

In some implementations, the array substrate further includes a control line coupled to the control circuit to receive the control signal, and coupled to control terminals of the switches.

In some implementations, each of the switches includes a transistor, a first electrode and a second electrode of the transistor are coupled to second ends of two data lines in corresponding one of the groups, and a gate of the transistor is coupled to the control line.

In some implementations, the control circuit includes: a signal generation sub-circuit, configured to output an initial signal when the second charge sharing phase starts; and an amplifying sub-circuit, configured to amplify the initial signal to obtain the control signal.

In some implementations, the array substrate further includes a plurality of gate lines, the gate lines and the data lines are intersected with each other, and the switches are at the second ends of the data lines.

In some implementations, the scanning period is a row scanning period during which a row of pixels coupled to each gate line are driven to display.

In some implementations, the scanning period is a frame display period for displaying a frame of image.

In another aspect, an embodiment of the present disclosure further provides a method for driving a display device, the display device includes an array substrate and a data driving circuit, the array substrate includes a plurality of data lines, and the data lines are divided into multiple groups, each of the groups includes at least two of the data lines, a first end of each of the data lines is coupled to the data driving circuit; the array substrate further includes a plurality of switches, the data lines in each of the groups are coupled to at least one of the switches, each of the switches is coupled to second ends of at least two of the data lines in corresponding one of the groups, the method includes: connecting first ends of the data lines in each group through the data driving circuit during a first charge sharing phase of each scanning period; controlling each of the switches to be turned on so that second ends of the data lines in corresponding one of the groups are connected together during a second charge sharing phase of each scanning period, and in each scanning period, the first charge sharing phase and the second charge sharing phase are at least partially overlapped with each other.

In some implementations, a data signal is provided by the data driving circuit to each of the data lines during a charging phase of each scanning period, and the charging phase starts from a timing at which the first charge sharing phase is finished.

In some implementations, the second charge sharing phase is finished at a timing earlier than or the same as that obtained by elapsing a time duration, required for the data signal transmitting from the first end of each data line to the second end of the data line, from the timing at which the first charge sharing phase is finished.

In some implementations, in the charging phase of each scanning period, data signals provided by the data driving circuit to the data lines in each group are equal in magnitude, the data signals provided to a portion of the data lines in each group are of positive polarity, and the data signals provided to another portion of the data lines in each group are of negative polarity.

In some implementations, in charging phases of adjacent scanning periods, data signals provided by the data driving circuit to each data line are equal in magnitude and opposite in polarity.

In some implementations, in each scanning period, the first charge sharing phase and the second charge sharing are equal in time duration.

In some implementations, the method further includes: outputting, by a signal generation sub-circuit, an initial signal when the second charge sharing phase starts; and amplifying, by an amplifying sub-circuit, the initial signal to obtain the control signal.

DESCRIPTION OF DRAWINGS

Drawings are used for further understanding the present disclosure, constitute a part of specification for explaining the present disclosure in conjunction with following embodiments, but the present disclosure is not limited thereto. In the drawings.

DESCRIPTION OF EMBODIMENTS

Embodiments and implementations of the present disclosure will be described in detail below in conjunction with accompanying drawings. It should be understood that, the embodiments and the implementations are described for merely illustrating and explaining the present disclosure, but the present disclosure is not limited thereto.

During a procedure for driving a liquid crystal display device, a gate driving circuit scans gate lines progressively (e.g., line by line), each of the gate lines is coupled to a row of pixels, and during each of the gate lines and the row of pixels coupled thereto being scanned, a data driving circuit provides data signals to data lines to charge the row of pixels being scanned. In order to prevent liquid crystal molecules from polarization, each of the data lines may be provided with data signals having polarities opposite to each other, for example, the data signals provided to each data line in adjacent scanning periods are opposite in polarity, so that adjacent pixels in each column receive data signals having polarities opposite to each other in adjacent scanning periods. That is to say, when the data signal of a certain data line in a current scanning period is a negative voltage, the data signal of the certain data line in a subsequent scanning period should be a positive voltage, thus there is a relatively large difference between the data signals, provided by the data driving circuit, of the certain data line in adjacent scanning periods, resulting in a large power consumption of the data driving circuit.

Figure 1A:
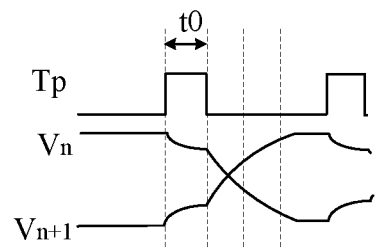
FIGS. 1a and 1b show diagrams for respectively illustrating charge sharing effects at two ends of each data line in related art.
Figure 1B:
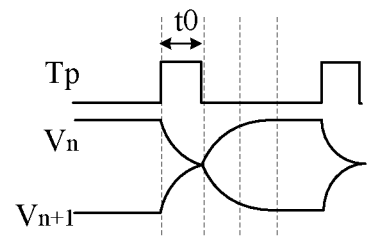

For example, the power consumption of the data driving circuit may be reduced by performing charge sharing between the data lines. Specifically, adjacent data lines may be provided with data signals having polarities opposite to each other in each scanning period, and each data line may be provided with data signals having polarities opposite to each other in adjacent scanning periods. The data lines may be divided into a plurality of groups. For example, each of the groups may include two data lines, the data driving circuit may first connect the two data lines in each of the groups together to perform charge sharing so that both the voltages of the two data lines approach to zero, then each of the data lines is provided with a data signal having a polarity opposite to that in a previous scanning period. In such way, in the current scanning period, the voltage at each of the data lines can quickly reach a target voltage. However, for a large size display device, due to a significant transferring latency, each of the data lines has a good charge sharing effect at an end thereof proximal to the data driving circuit (as shown in Fig. b, when a charge sharing phase t0 is finished, a voltage $V_n$ of a $n^{th}$ data line and a voltage $V_{n+1}$ of a $(n+1)^{th}$ data line are completely neutralized), and has a poor charge sharing effect at another end thereof distal to the data driving circuit (as shown in FIG. 1a, when the charge sharing phase t0 is finished, there is still a significant difference between the voltage $V_n$ of the $n^{th}$ data line and the voltage $V_{n+1}$ of the $(n+1)^{th}$ data line), thus during a display phase, pixels coupled to the end of each of the data lines distal to the data driving circuit are charged for a short duration, cannot reach a target gray scale, thereby a uniformity of display is affected. In FIGS. 1a and 1b, Tp refers to a control signal for controlling the data lines in each of the groups to be connected together.

Figure 2:
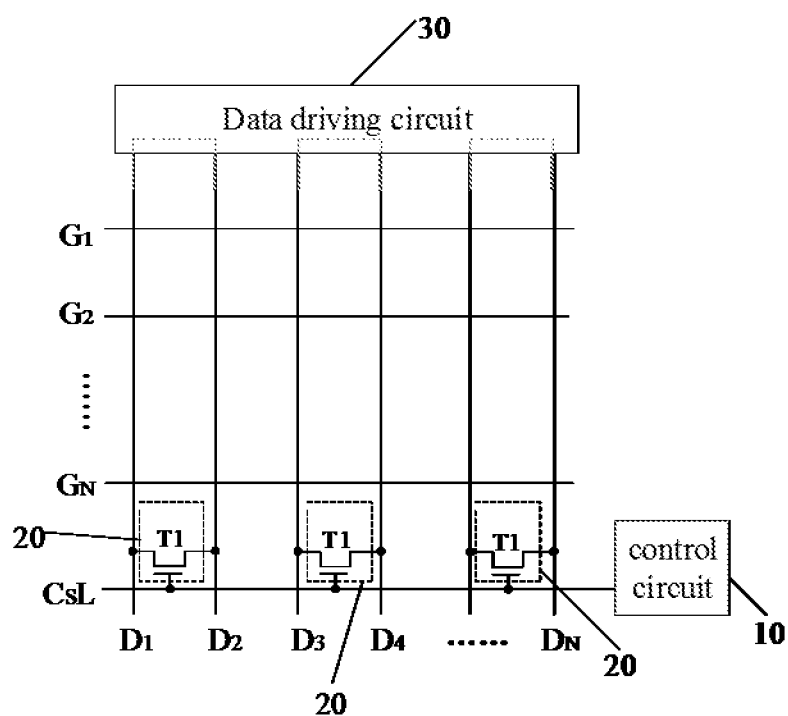
FIG. 2 shows a structural diagram of a display device according to an embodiment of the present disclosure.

In order to improve the uniformity of display, an embodiment of the present disclosure provides a display device. As shown in FIG. 2, the display device includes an array substrate, a control circuit 10 and a data driving circuit 30. The array substrate includes a plurality of data lines $D_1$ through $D_N$, the data lines $D_1$ through $D_N$ are divided into a plurality of groups, each of the groups includes at least two of the data lines, the data driving circuit 30 is configured to connect first ends of the data lines in each of the groups together during a first charge sharing phase of each scanning period. The array substrate further includes a plurality of switches 20, the data lines in each of the groups are coupled to at least one of the switches 20, and each of the switches 20 is coupled to second ends of at least two of the data lines in corresponding one of the groups. The control circuit 10 is configured to output a control signal when a second charge sharing phase of each scanning period starts. Each of the switches 20 is turned on according to the control signal to connect second ends of corresponding data lines in corresponding one of the groups. In each scanning period, the first charge sharing phase and the second charge sharing phase are at least partially overlapped with each other.

It should be understood that, the scanning period may be a row scanning period during which a row of pixels coupled to each of gate lines are driven to display. Alternatively, the scanning period may also be a frame display period for displaying a frame of image. Specifically, the scanning period may be determined according to a reversing mode of polarity of data signal provided to each of the data lines. For example, when each of the data lines is provided with data signals having polarities opposite to each other in adjacent row scanning periods, the scanning period is the row scanning period, and when each of the data lines is provided with data signals having polarities the same with each other in adjacent row scanning periods, but is provided with data signals having polarities opposite to each other for displaying adjacent frames of image, the scanning period is the frame display period.

It should be noted that, the first end and the second end of each of the data lines refer to two portions of each of the data lines proximal to endpoints of each of the data lines, rather than the endpoints of each of the data lines.

In the embodiment, by providing the switches 20 at the second ends of the data lines distal to the data driving circuit 30, charge sharing can be achieved at two ends of each of the data lines in each of the groups, thus in each scanning period, pixels coupled to different positions of each of the data lines can be charged from a same potential to a potential the polarity of which is opposite to that in a previous scanning period, all the pixels coupled to different positions of each of the data lines can reach target gray scale, the uniformity of display is improved.

The data driving circuit 30 is further configured to provide data signals to the data lines $D_1$ through $D_N$ during a charging phase of each scanning period. In each scanning period, the charging phase may start from a timing at which the first charge sharing phase is finished. Moreover, in charging phases of adjacent scanning periods, data signals provided by the data driving circuit 30 to any individual data line may be equal in magnitude and opposite in polarity. It should be understood that, after the first charge sharing phase is finished, the first ends of the data lines in each of the groups are disconnected by the data driving circuit 30, and after the second charge sharing phase is finished, each of the switches 20 is turned off.

In addition, in the charging phase of each scanning period, data signals provided by the data driving circuit to the data lines in each of the groups may be equal in magnitude and not the same with each other in polarity. For example, the data signals provided to the data lines in a portion of the groups may be equal in magnitude and have positive polarities, and the data signals provided to the data lines in another portion of the groups may be equal in magnitude and have negative polarities, thereby after charging sharing, each of the data lines has a voltage approaching to a target voltage to be reached in the subsequent scanning period, thus the power consumption of the data driving circuit 30 is reduced.

In order to facilitate charge sharing of the data lines in each of the groups, as shown in FIG. 2, each of the groups may include two adjacent data lines, so that the two adjacent data lines in each of the groups can be connected together by one of the switches 20. When each of the groups includes two adjacent data lines, data signals provided by the data driving circuit 30 to the two adjacent data lines in each of the groups during each scanning period are equal in magnitude and opposite in polarity.

As shown in FIG. 2, each of the switches 20 may include a transistor T1, a first electrode and a second electrode of the transistor T1 may be coupled to second ends of two data lines in corresponding one of the groups, a gate of the transistor T1 may be provided with a turn-on voltage so that the first electrode and the second electrode of the transistor T1 are connected electrically to connect the two data lines in the corresponding one of the groups together. In the present disclosure, the transistor T1 may be an N-type transistor, and correspondingly, the control signal for turning on the transistor T1 may be a high level signal. Certainly, the transistor T1 may also be a P-type transistor, and in such case, the control signal for turning on the transistor T1 may be a low level signal.

In order to control a plurality of transistors T1, as shown in FIG. 2, the array substrate may further includes a control line CsL coupled to the control circuit 10 to receive the control signal. The gate of each of the transistors may be coupled to the control line CsL.

It should be understood that, although FIG. 2 shows an example in which each of the groups includes merely two adjacent data lines, however, in practical applications, each of the groups may include more data lines, and in such case, every two adjacent data lines in each of the groups may be connected by one of the switches 20 (e.g., transistor T1). For example, FIG. 3 shows an example in which each of the groups includes three adjacent data lines.

Figure 4:
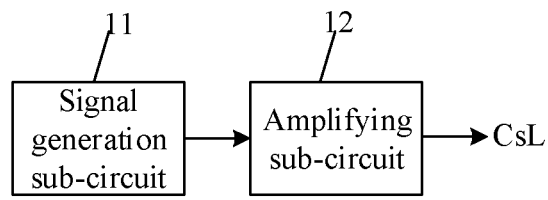
FIG. 4 shows a structural diagram of a control circuit in a display device according to an embodiment of the present disclosure.

Furthermore, in order to ensure that the control signal output from the control circuit 10 can reach a voltage capable of turning on the transistor T1, the control circuit 10 may first generate a small voltage signal, and then the voltage signal is amplified. Specifically, as shown in FIG. 4, the control circuit 10 may include a signal generation sub-circuit 11 and an amplifying sub-circuit 12. The signal generation sub-circuit 11 is configured to output an initial signal when the second charge sharing phase starts. The amplifying sub-circuit 12 is configured to amplify the initial signal to obtain the control signal, and the control signal is output to the control line CsL.

Figure 3:
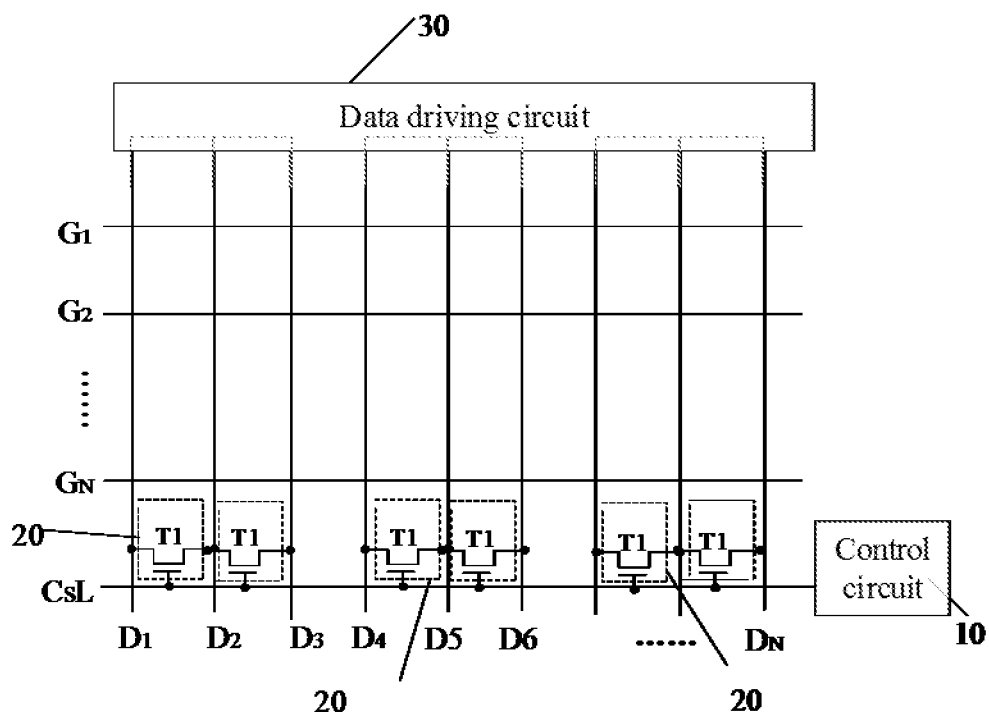
FIG. 3 shows a structural diagram of a display device according to an embodiment of the present disclosure.

As shown in FIGS. 2 and 3, the array substrate may further include a plurality of gate lines $G_1$ through $G_N$, and the gate lines $G_1$ through $G_N$ are intersected with the data lines $D_1$ through $D_N$ to define a plurality of pixels. In order to prevent the switches 20 from affecting an aperture ratio of the pixels, in some implementations, each of the switches 20 is at the second end of corresponding one of the data lines.

In some implementations, the data lines $D_1$ through $D_N$ may be parallel to each other, and the gate lines $G_1$ through $G_N$ may be parallel to each other.

In order to reduce an influence of transferring latency on the uniformity of display as much as possible to make time durations for charging the pixels coupled to each of the data lines be almost identical, the second charge sharing phase may be finished at a timing earlier than or the same as that obtained by elapsing a time duration, required for the data signal transmitting from the first end of each of the data lines to the second end of each of the data lines, from the timing at which the first charge sharing phase is finished. In such way, when the data signal provided by the data driving circuit reaches the second end of each data line, the charge sharing for the second end of the data line has been finished.

In some implementations, in each scanning period, the first charge sharing phase and the second charge sharing phase may be equal in time.

Figure 5A:
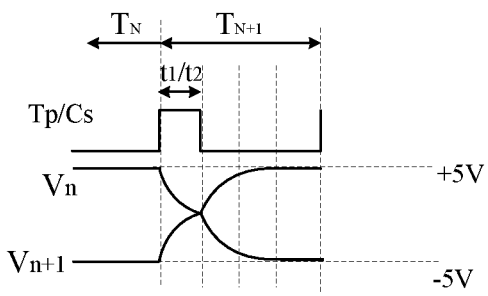
FIGS. 5a through 5c show timing diagrams of signals of data lines according to embodiments of the present disclosure.
Figure 5B:
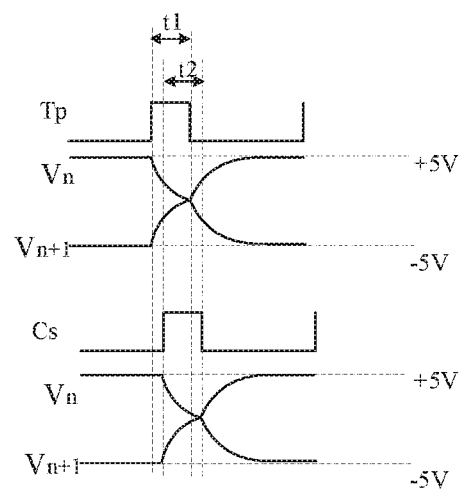
Figure 5C:
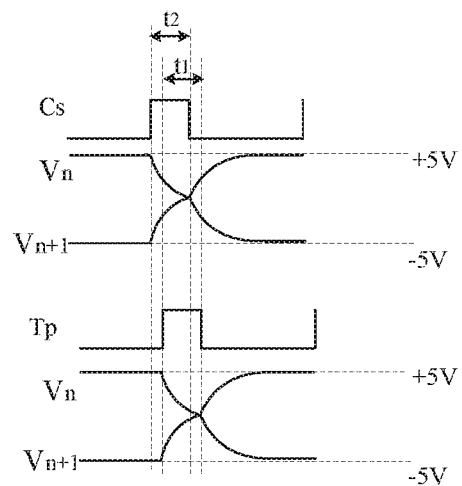

FIGS. 5a through 5c show timing diagrams of signals of data lines according to embodiments of the present disclosure respectively, where the control signal Tp refers to a signal for controlling the data driving circuit 30, the data driving circuit 30 is configured to connect the first ends of the data lines in each of the groups together according to the control signal Tp, the control signal Cs refers to a signal output from the control circuit 10, and each of the switches 20 is turned on according to the control signal Cs. Specifically, FIG. 5a shows an example in which the first charge sharing phase t1 and the second charge sharing phase t2 start at a same timing and finish at another same timing, that is, the first charge sharing phase t1 and the second charge sharing phase t2 may be overlapped completely, and durations of the control signals Tp and Cs are completely the same with each other. For example, the data signal $V_n$ of the $n^{th}$ data line in a current scanning period $T_N$ is at a voltage of +5V, a target voltage of the data signal $V_n$ of the $n^{th}$ data line in a subsequent scanning period $T_{N+1}$ is −5V, the data signal $V_{n+1}$ of the $(n+1)^{th}$ data line in the current scanning period $T_N$ is at a voltage of −5V, a target voltage of the data signal $V_{n+1}$ of the $(n+1)^{th}$ data line in the subsequent scanning period $T_{N+1}$ is +5V, and by subjecting to the first charge sharing phase t1 (or the second charge sharing phase t2), both the $n^{th}$ and $(n+1)^{th}$ data lines are at a voltage of 0V. In such way, in the charging phase of the subsequent scanning period, the data signal $V_n$ of the $n^{th}$ data line changes from 0V to −5V rather than from +5V to −5V, and the data signal $V_{n+1}$ of the $(n+1)^{th}$ data line changes from 0V to +5V rather than from −5V to +5V, the power consumption of the data driving circuit is reduced.

Due to transferring latency of the data signal on each of the data lines $D_1$ through $D_N$, the timing from which the pixels coupled to the second ends of the data lines $D_1$ through $D_N$ are started to be charged is later than the timing from which the pixels coupled to the first ends of the data lines $D_1$ through $D_N$ are started to be charged, thus in a case where the first charge sharing phase t1 and the second charge sharing phase t2 in each scanning period are equal in time, a start timing of the second charge sharing phase t2 may be later than that of the first charge sharing phase t1, as long as the second charge sharing phase t2 is finished at a timing not later than that obtained by elapsing a time duration, required for the data signal transmitting from the first end of each of the data lines to the second end of each of the data lines, from the timing at which the first charge sharing phase t1 is finished. As shown in FIG. 5b, assuming that a time t is required for transferring the data signal from the first end of each of the data lines to the second end of each of the data lines, the start timing of the second charge sharing phase t2 may be later than that of the first charge sharing phase t2 by a time duration of t. In such way, a finishing timing of the second charge sharing phase t2 is also later than that of the first charge sharing phase t1 by the time duration of t. The data signal is started to be transferred from the first end of each of the data lines to the second end of each of the data lines at the timing at which the first charge sharing phase t1 is finished, after elapsing the time duration of t, the data signal reaches the second end of the data line, and at the same time, the second charge sharing phase t2 is finished, that is, charge sharing is finished for the second end of the data line.

Certainly, the start timing of the second charge sharing phase t2 may also be earlier than that of the first charge sharing phase t1, and the finishing timing of the second charge sharing phase t2 may also be earlier than that of the first charge sharing phase t1. As shown in FIG. 5c, the first charge sharing phase t1 and the second charge sharing phase t2 are equal in time duration, the start timing of the second charge sharing phase t2 is earlier than that of the first charge sharing phase t1, and the finishing timing of the second charge sharing phase t2 is earlier than that of the first charge sharing phase t1. It should be understood that, the time by which the second charge sharing phase t2 is earlier than the first charge sharing phase t1 should be not too long, for example, the time by which the second charge sharing phase t2 is earlier than the first charge sharing phase t1 may range from 1/20 of the second charge sharing phase t2 to 1/5 of the second charge sharing phase t2, and it may also be determined as needed.

Correspondingly, an embodiment of the present disclosure provides a method for driving a display device. The display device includes an array substrate and a data driving circuit. The array substrate includes a plurality of data lines, and the data lines are divided into multiple groups, each of the groups includes at least two of the data lines, a first end of each of the data lines is coupled to the data driving circuit. The array substrate further includes a plurality of switches, the data lines in each group are coupled to at least one of the switches, each of the switches is coupled to at least a portion of data lines in each of the groups, each of the switches is coupled to second ends of at least two of the data lines in corresponding one of the groups, the method includes: connecting first ends of the data lines in each group together through the data driving circuit during a first charge sharing phase of each scanning period; controlling each of the switches to be turned on so that second ends of the data lines in corresponding one of the groups are connected together during a second charge sharing phase of each scanning period, and in each scanning period, the first charge sharing phase and the second charge sharing phase are at least partially overlapped with each other.

The method may further include: providing a data signal by the data driving circuit to each of the data lines during a charging phase of each scanning period, and the charging phase starts from a timing at which the first charge sharing phase is finished.

For example, the scanning period may be a row scanning period during which a row of pixels coupled to each of gate lines are driven to display. Generally, each row of pixels are coupled to one gate line, that is, during each scanning period, a gate driving circuit provides a scanning signal to one gate line to drive the row of pixels coupled to the one gate line to perform displaying. Alternatively, the scanning period may also be a frame display period for displaying a frame of image.

In order to ensure that charge sharing has been finished for the second end of each of the data lines when the data signal provided by the data driving circuit reaches the second end of each of the data lines, during each scanning period, the second charge sharing phase is finished at another timing earlier than or the same as that obtained by elapsing a time duration, required for the data signal transmitting from the first end of each of the data lines to the second end of each of the data lines, from the timing at which the first charge sharing phase is finished.

For example, in each scanning period, the first charge sharing phase and the second charge sharing phase may be equal in time duration. Moreover, the first charge sharing phase t1 and the second charge sharing phase may start at a same time and finish at another same time. That is, the first charge sharing phase t1 and the second charge sharing phase t2 may be overlapped completely. Alternatively, the start timing of the second charge sharing phase t2 may be earlier than that of the first charge sharing phase t1, and the finishing timing of the second charge sharing phase t2 may be earlier than that of the first charge sharing phase t1. Furthermore, under a premise that the second charge sharing phase is finished at a timing earlier than or the same as that obtained by elapsing a time duration, required for the data signal transmitting from the first end of each of the data lines to the second end of each of the data lines, from the timing at which the first charge sharing phase is finished, the start timing of the second charge sharing phase may be appropriately later than that of the first charge sharing phase, and the finishing timing of the second charge sharing phase may be appropriately later than that of the first charge sharing phase. For example, in a case where the first charge sharing phase and the second charge sharing phase are equal in time duration, the start timing of the second charge sharing phase may be later than that of the first charge sharing phase by a time during which the data signal is transferred from the first end of each data line to the second end of the data line, and the finishing timing of the second charge sharing phase may also be later than that of the first charge sharing phase by the time during which the data signal is transferred from the first end of each data line to the second end of the data line.

In the charging phase of each scanning period, data signals provided by the data driving circuit to the data lines in each group may be equal in magnitude, the data signals provided to a portion of the data lines in each group are of positive polarity, and the data signals provided to another portion of the data lines in each group are of negative polarity. Moreover, in charging phases of adjacent scanning periods, data signals provided by the data driving circuit to each data line may be equal in magnitude and opposite in polarity.

In addition, in order to ensure the voltage capable of turning on the switches, the method further may further include: outputting, by a signal generation sub-circuit, an initial signal when the second charge sharing phase starts; and amplifying, by an amplifying sub-circuit, the initial signal to obtain the control signal for controlling each of the switches to be turned on.

For example, the control signal may be provided by a control circuit.

It should be understood that, the above embodiments and implementations are merely exemplary embodiments and implementations for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. A display device, comprising an array substrate and a data driving circuit, the array substrate comprises a plurality of data lines and a plurality of gate lines, the gate lines and the data lines are intersected with each other, and the data lines are divided into multiple groups, each of the groups comprises at least two of the data lines, a first end of each of the data lines is coupled to the data driving circuit; the data driving circuit is configured to connect the data lines in each of the groups together at first ends of the data lines under control of a first control signal during a first charge sharing phase of each scanning period, wherein
the array substrate further comprises a plurality of switches, second ends of the data lines in each of the groups are coupled to at least one of the switches, each of the switches is coupled to the second ends of at least two of the data lines in corresponding one of the groups;
the gate lines are arranged in a region between each of the switches and the data driving circuit;
the display device further comprises a control circuit, the control circuit is configured to output a second control signal during a second charge sharing phase of each scanning period, each of the switches is turned on according to the second control signal to connect corresponding data lines in corresponding one of the groups together at the second ends of the corresponding data lines;
the first control signal and the second control signal are independent of each other;
in each scanning period, one of the first charge sharing phase and the second charge sharing phase is earlier than the other one of the first charge sharing phase and the second charge sharing phase; and
the first ends of the data lines are proximal to the data driving circuit, the second ends of the data lines are distal to the data driving circuit, and the first ends and the second ends of the data lines are proximal to endpoints of the data lines,
wherein the data driving circuit is fun her configured to provide a data signal to each of the data lines during a charging phase of each scanning period, and the charging phase starts from a timing at winch the first charge sharing phase is finished;
in the charging phase of each scanning period, data signals provided by the data driving circuit to the data lines in each group are equal in magnitude, the data signals provided to a portion of the data lines in each group are of positive polarity, and the data signals provided to another portion of the data lines in each group are of negative polarity; and
in charging phases of adjacent scanning periods, data signals provided by the data driving circuit to each data line are equal in magnitude and opposite in polarity.

2. The display device of claim 1, wherein the second charge sharing phase is finished at a timing earlier than or the same as that obtained by elapsing a time duration, required for the data signal transmitting from the first end of each data line to the second end of the data line, from the timing at which the first charge sharing phase is finished.

3. The display device of claim 2, wherein in each scanning period, the first charge sharing phase and the second charge sharing are equal in time duration.

4. The display device of claim 1, wherein each of the groups consists of two adjacent data lines.

5. The display device of claim 1, wherein the array substrate further comprises a control line coupled to the control circuit to receive the second control signal, and coupled to control terminals of the switches.

6. The display device of claim 5, wherein each of the switches comprises a transistor, a first electrode and a second electrode of the transistor are coupled to second ends of two data lines in corresponding one of the groups, and a gate of the transistor is coupled to the control line.

7. The display device of claim 1, wherein the control circuit comprises:
a signal generation sub-circuit, configured to output an initial signal when the second charge sharing phase starts; and
an amplifying sub-circuit, configured to amplify the initial signal to obtain the control signal.

8. The display device of claim 1, wherein the scanning period is a row scanning period during which a row of pixels coupled to each gate line are driven to display.

9. The display device of claim 1, wherein the scanning period is a frame display period for displaying a frame of image.

10. A method for driving a display device, the display device comprises an array substrate and a data driving circuit, the array substrate comprises a plurality of data lines and a plurality of gate lines, the gate tines and the data lines are intersected with each other, and the data lines are divided into multiple groups, each of the groups includes at least two of the data lines, a first end of each of the data lines is coupled to the data driving circuit, the array substrate further comprises a plurality of switches, second ends of the data lines in each of the groups are coupled to at least one of the switches, each of the switches is coupled to the second ends of at least two of the data lines in corresponding one of the groups, the gate lines are arranged in a region between each of the switches and the data driving circuit, the method comprises:
connecting the data lines in each group together at first ends of the data lines through the data driving circuit under control of a first control signal during a first charge sharing phase of each scanning period;
controlling each of the switches to be turned on by a second control signal so that corresponding data lines in corresponding one of the groups are connected together at the second ends of the corresponding data lines during a second charge sharing phase of each scanning period,
wherein the first control signal and the second control signal are independent of each other,
in each scanning period, one of the first charge sharing phase and the second charge sharing phase is earlier than the other one of the first charge sharing phase and the second charge sharing phase, and
the first ends of the data lines are proximal to the data driving circuit, the second ends of the data lines are distal to the data driving circuit, and the first ends and the second ends of the data lines are proximal to endpoints of the data lines,
the method further comprises:
providing a data signal by the data driving circuit to each of the data lines during a charging phase of each scanning period, and the charging phase starts from a timing at which the first charge sharing phase is finished,
wherein the charging phase of each scanning period, data signals provided by the data driving circuit to the data lines in each group are equal in magnitude, the data signals provided to a portion of the data lines in each group are of positive polarity, and the data signals provided to another portion of the data tines in each group are of negative polarity; and in charging phases of adjacent scanning periods, data signals provided by the data driving circuit to each data line axe equal in magnitude and opposite in polarity.

11. The method of claim 10, wherein in each scanning period, the second charge sharing phase is finished at a timing earlier than or the same as that obtained by elapsing a time duration, required for the data signal transmitting from the first end of each data line to the second end of the data line, from the timing at which the first charge sharing phase is finished.

12. The method of claim 11, wherein in each scanning period, the first charge sharing phase and the second charge sharing are equal in time duration.

13. The method of claim 10, further comprising:
outputting, by a signal generation sub-circuit, an initial signal when the second charge sharing phase starts; and
amplifying, by an amplifying sub-circuit, the initial signal to obtain the control signal.

14. A display device, comprising an array substrate and a data driving circuit, the array substrate comprises a plurality of data lines and a plurality of gate lines, the gate lines and the data lines are intersected with each other, and the data lines are divided into multiple groups, each of the groups comprises at least two of the data lines, a first end of each of the data lines is coupled to the data driving circuit; the data driving circuit is configured to connect the data lines in each of the groups together at first ends of the data lines during a first charge sharing phase of each scanning period, wherein the array substrate further comprises a plurality of switches, second ends of the data lines in each of the groups are coupled to at least one of the switches, each of the switches is coupled to the second ends of at least two of the data lines in corresponding one of the groups;
the gate lines are arranged in a region between each of the switches and the data driving circuit;
the display device further comprises a control circuit, the control circuit is configured to output a control signal during a second charge sharing phase of each scanning period, each of the switches is turned on according to the control signal to connect corresponding data lines in corresponding one of the groups together at the second ends of the corresponding data lines;
in each scanning period, the first charge sharing phase and the second charge sharing phase are overlapped with each other, or one of the first charge sharing phase and the second charge sharing phase is earlier than the other one of the first charge sharing phase and the second charge sharing phase; and
the first ends of the data lines are proximal to the data driving circuit, the second ends of the data lines are distal to the data driving circuit, and the first ends and the second ends of the data lines are proximal to endpoints of the data lines.

* * * * *